(12) United States Patent
Perlsweig

(10) Patent No.: US 8,763,306 B1
(45) Date of Patent: Jul. 1, 2014

(54) CAGE FOR PROTECTING A POND PLANT AND METHOD OF USE

(71) Applicant: Robert C. Perlsweig, Woodland Hills, CA (US)

(72) Inventor: Robert C. Perlsweig, Woodland Hills, CA (US)

( * ) Notice: Subject to any disclaimer, the term of this patent is extended or adjusted under 35 U.S.C. 154(b) by 0 days.

(21) Appl. No.: 14/103,648

(22) Filed: Dec. 11, 2013

(51) Int. Cl.
A01G 9/02 (2006.01)

(52) U.S. Cl.
USPC ............................. 47/66.1; 47/41.1; 47/65.5

(58) Field of Classification Search
USPC ........ 47/31, 66.1, 65.531, 41.01, 41.11, 65.5, 47/66.6
See application file for complete search history.

(56) References Cited

U.S. PATENT DOCUMENTS

| 1,780,950 | A | * | 11/1930 | Stevason | 47/31 |
|---|---|---|---|---|---|
| 4,648,203 | A | | 3/1987 | Worzek | |
| 4,712,329 | A | | 12/1987 | Anderson et al. | |
| 4,986,025 | A | | 1/1991 | Imperial | |
| 5,003,724 | A | | 4/1991 | Vestuti | |
| 5,046,452 | A | * | 9/1991 | Laslzlo et al. | 119/217 |
| 5,184,421 | A | | 2/1993 | Meharg | |
| 5,355,623 | A | | 10/1994 | Brown | |
| 5,711,106 | A | | 1/1998 | Ellis | |
| 5,918,411 | A | | 7/1999 | Hadrava | |
| 7,322,154 | B2 | * | 1/2008 | Forbis, Sr. et al. | 52/3 |
| 7,707,769 | B1 | * | 5/2010 | Courter | 47/41.12 |
| 7,798,102 | B2 | * | 9/2010 | Mouzakitis et al. | 119/200 |
| 8,381,440 | B1 | | 2/2013 | Jabs | |
| 8,464,463 | B1 | * | 6/2013 | Fraser | 47/31 |
| 8,484,888 | B2 | * | 7/2013 | Butler | 47/32 |
| 2002/0069831 | A1 | * | 6/2002 | Clark | 119/215 |
| 2007/0130825 | A1 | | 6/2007 | Stearns et al. | |
| 2009/0145368 | A1 | * | 6/2009 | Brauman | 119/215 |
| 2010/0095585 | A1 | * | 4/2010 | Hall | 47/41.11 |
| 2011/0219682 | A1 | * | 9/2011 | Butler | 47/31 |

* cited by examiner

Primary Examiner — Rob Swiatek
Assistant Examiner — Morgan T Barlow
(74) Attorney, Agent, or Firm — Timothy Thut Tyson; Ted Masters

(57) ABSTRACT

A cage protects the roots of a pond plant planted in a pot from fish and other animals. If the roots are eaten, the plant will die. The pot has a rim and the pot resides on the bottom of a pond. The pond plant has a plurality of stems and each stem has a leaf. The cage covers the top of the pot so that the fish cannot gain access to the roots. In one embodiment the cage includes two sections that are connected together and to the rim of the pot. In another embodiment the cage is a single piece. In both embodiments the leaves of the pond plant are rolled up and passed upwardly through a grid of the cage.

11 Claims, 9 Drawing Sheets

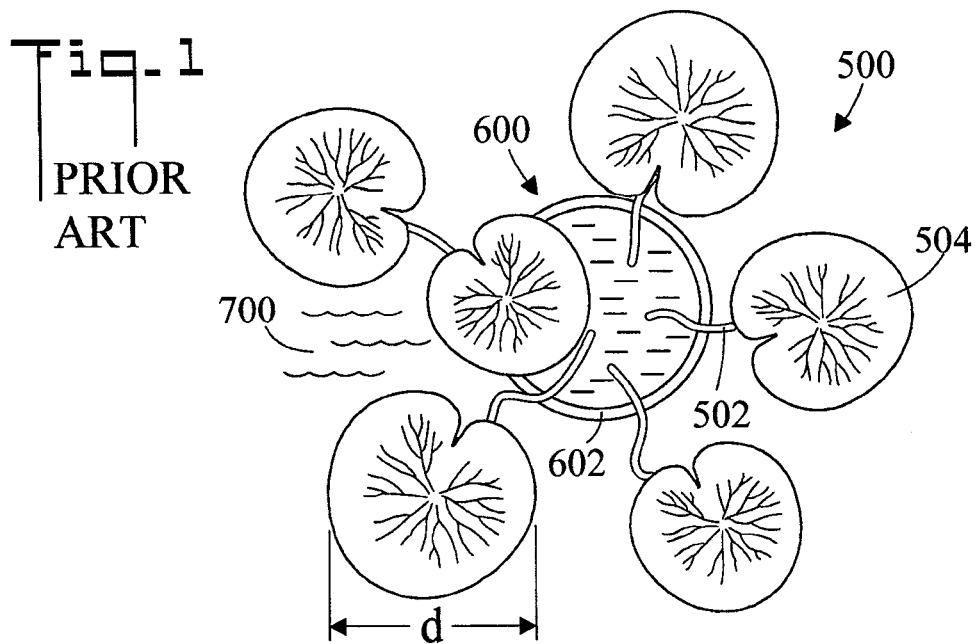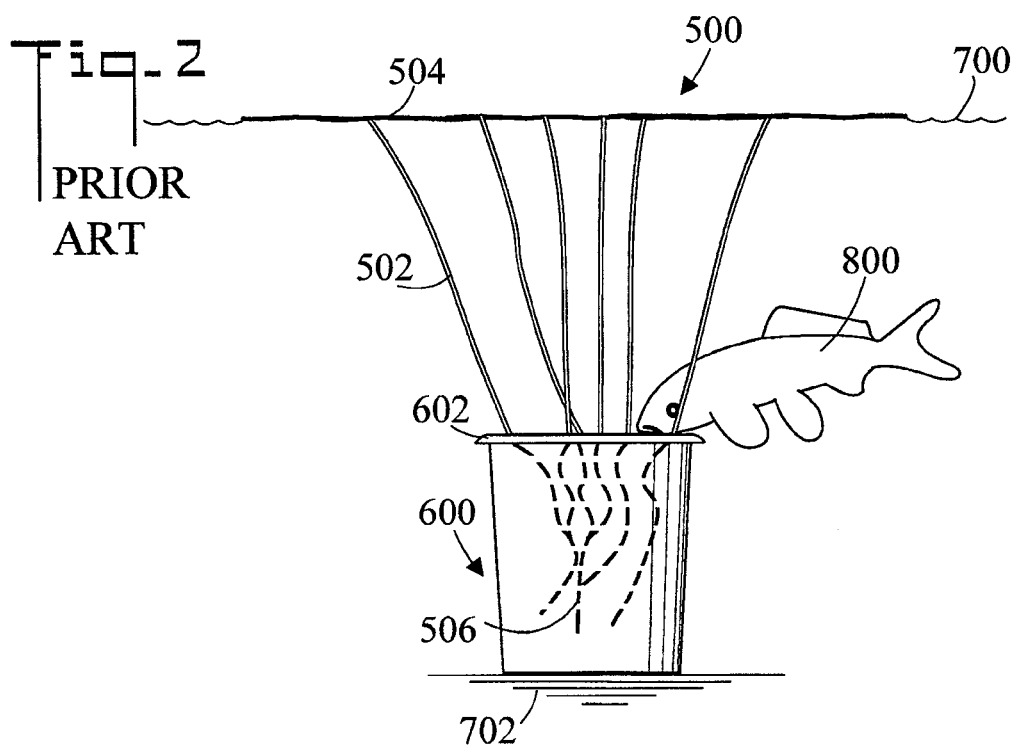

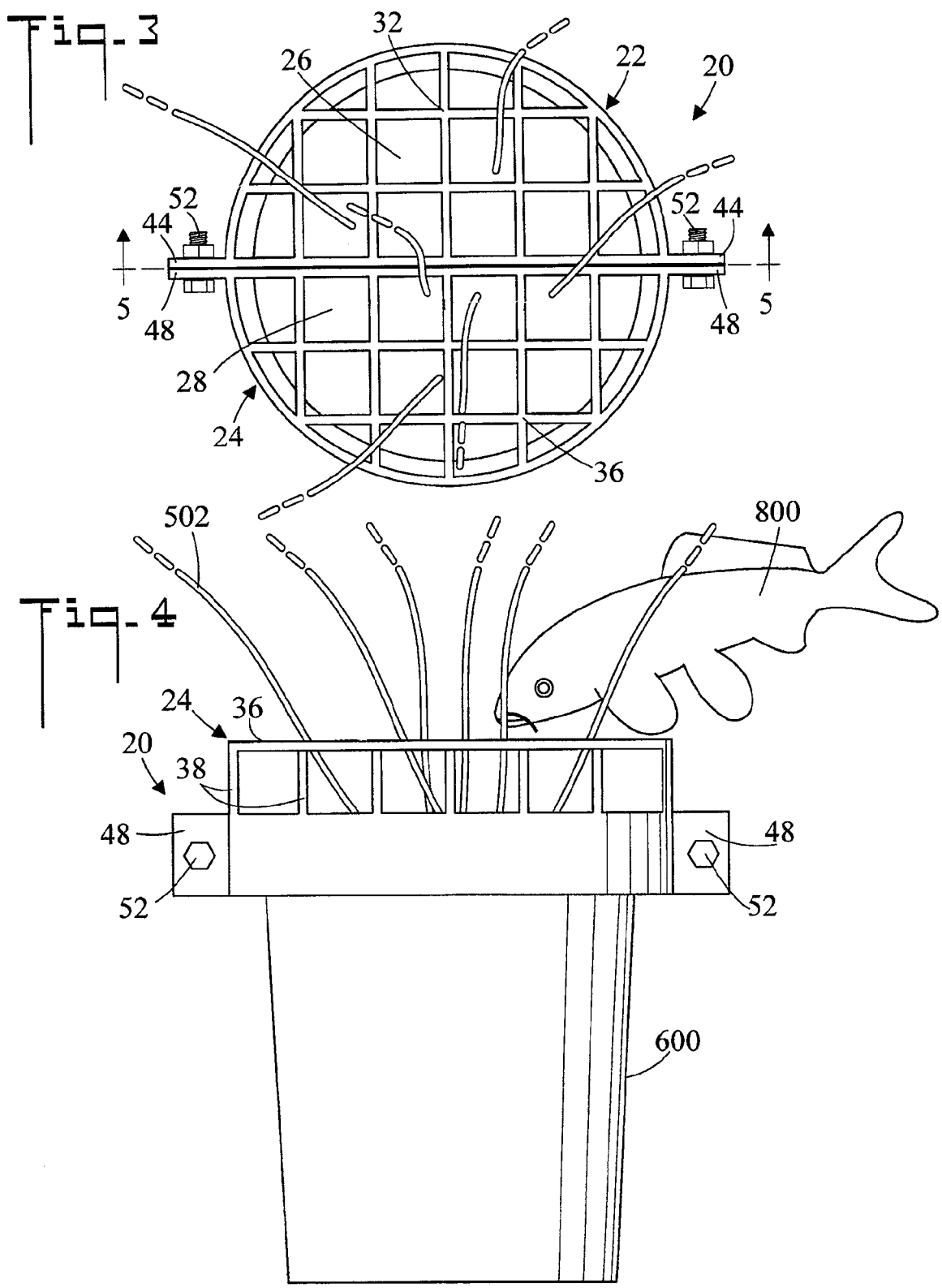

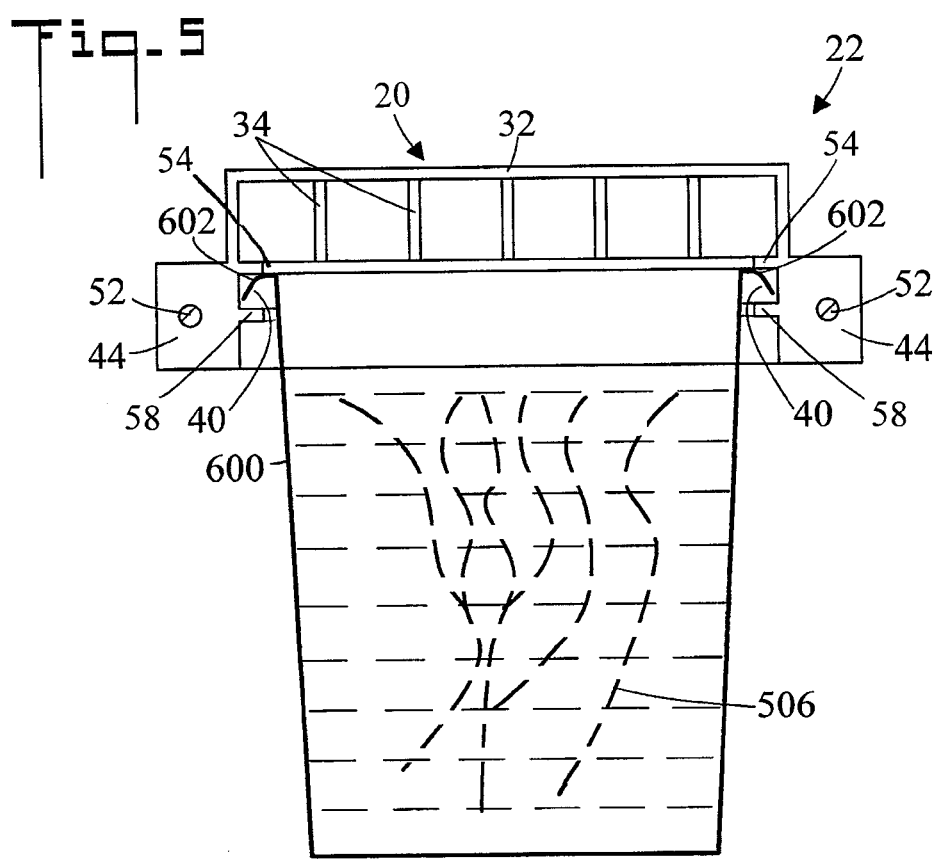

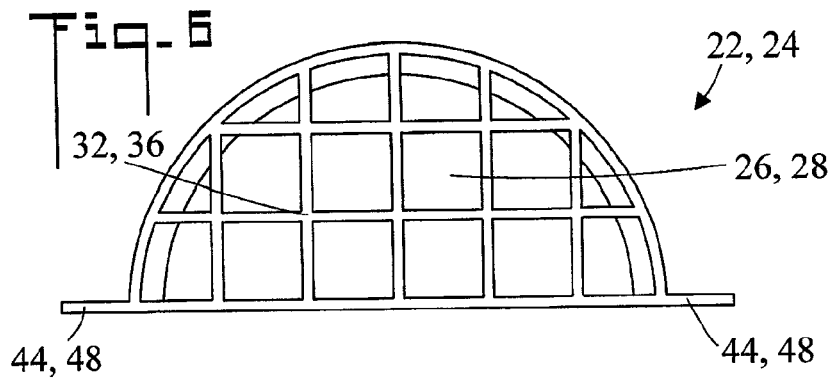
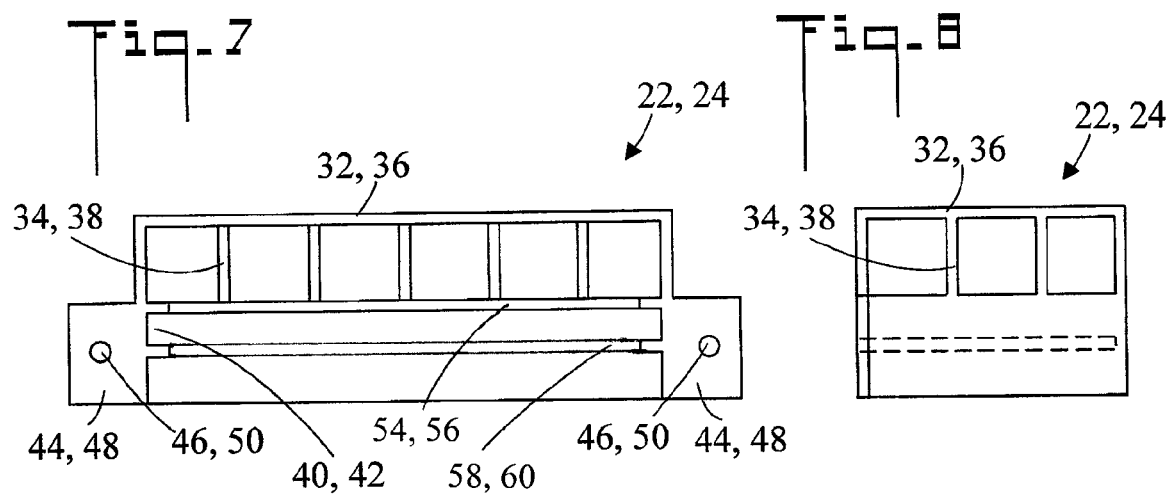
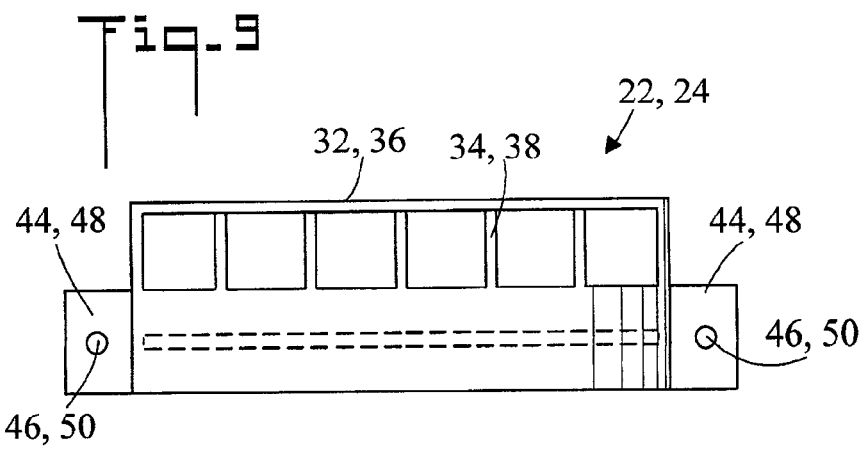

CAGE FOR PROTECTING A POND PLANT AND METHOD OF USE

TECHNICAL FIELD

The present invention pertains generally to pond plants, and more particularly to a cage that protects a pond plant growing in a pot from fish or other animals.

BACKGROUND OF THE INVENTION

Pond plants growing in pots are well known in the art. One such plant is the water lily. The pot is placed on the bottom of the pond and the leaves or pads of the water lily float to the surface. The fish in the pond will not eat the stems or leaves but they will dig in the dirt in the pot until they expose the roots that are much tendered that the stems and leaves and will eat the roots. This feeding will eventually kill the plant.

BRIEF SUMMARY OF THE INVENTION

The present invention is directed to a cage for protecting a pond plant planted in a pot by preventing fish, turtles, or other animals from digging in the dirt in the pot and eating the roots of the plant. The cage is attached to the top of the pot. It has openings that allow the leaves and stems of the pond plant to pass to the surface. The cage comes in different sizes and shapes to accommodate various pot configurations.

In accordance with one embodiment, the cage includes first and second sections that are removably connectable to each other and to the rim of the pot. The first section has at least one opening that is of a sufficient size to pass the leaf and stem of the pond plant, and the second section also includes at least one opening that is of a sufficient size to pass the leaf and stem of the pond plant.

In accordance with another embodiment, the cage includes a first grid that is supported by a first plurality of legs, and a second grid that is supported by a second plurality of legs.

In accordance with another embodiment, the first and second grids are semi-circular.

In accordance with another embodiment, the first and second grids each have a truncated semi-circular shape, so that when the first and second sections are connected to each other and to the rim of the pot the first and second sections reside in spaced apart relationship.

In accordance with another embodiment, the first section includes a pair of spaced apart first tabs, each of the first tabs having a hole. The second section includes a pair of spaced apart second tabs, each of the second tabs having a hole. The first and second sections are connectable by bolting the pair of spaced apart first tabs to the pair of spaced apart second tabs.

In accordance with another embodiment, the first section includes a first rim-receiving groove, and the second section includes a second rim-receiving groove. The first and second rim-receiving grooves are shaped and dimensioned to receive the rim of the pot.

In accordance with another embodiment, the openings of the first and second sections are of sufficient size to pass a leaf that has been rolled up.

In accordance with another embodiment, the cage does not include two sections but rather comprises a unitary cage that is removably connectable to the rim of the pot. The unitary cage has a plurality of openings that are of sufficient size to pass the leaf and stem of the pond plant. The unitary cage includes a grid that is supported by a plurality of legs. The unitary cage is held on the rim of the pot by bolts passing underneath the rim.

In another embodiment, the cage cooperates with a male fish and a female fish to enhance fish roe fertilization and incubation. When a female koi is sufficiently pregnant, the male koi bumps against her knocking her roe into the water. If the male does not do this, the female can become sick and die. It is difficult for the male to knock the roe out of the female in clear water. He needs to knock the female against something. The pot and cage of the potted pond plant provide objects against which the male koi can knock the female koi. Once the roe is floating in the water, the male fertilizes it with his milt. The fertilized roe gradually settles to the bottom of the pond. But in the process, the koi usually eat all of the roe. The cage and top of the pot then provide an added benefit. If the discharged roe falls through the cage and into the pot, it is protected from being eaten. If some of the roe develops into baby fish, they are protected inside the cage and pot and are small enough to swim through the spaces in the cage out into the pond.

Other embodiments, in addition to the embodiments enumerated above, will become apparent from the following detailed description, taken in conjunction with the accompanying drawings, that illustrate, by way of example, the principles of the cage and method of use.

BRIEF DESCRIPTION OF THE DRAWINGS

FIG. 1 is a reduced top plan view of a prior art pond plant in a pot;

FIG. 2 is a reduced side elevation view of the pond plant in a pot;

FIG. 3 is a top plan view of a cage for protecting the roots of the pond plant in accordance with the present invention;

FIG. 4 is a side elevation view of the cage installed on the top of a pot having a pond plant;

FIG. 5 is a cross sectional view along the line 5-5 of FIG. 3;

FIG. 6 is a top plan view of first and second sections of the cage;

FIG. 7 is front elevation view of the first and second sections;

FIG. 8 is a side elevation view of the first and second sections;

FIG. 9 is a rear elevation view of the first and second sections;

DETAILED DESCRIPTION OF THE INVENTION

Figure 10:
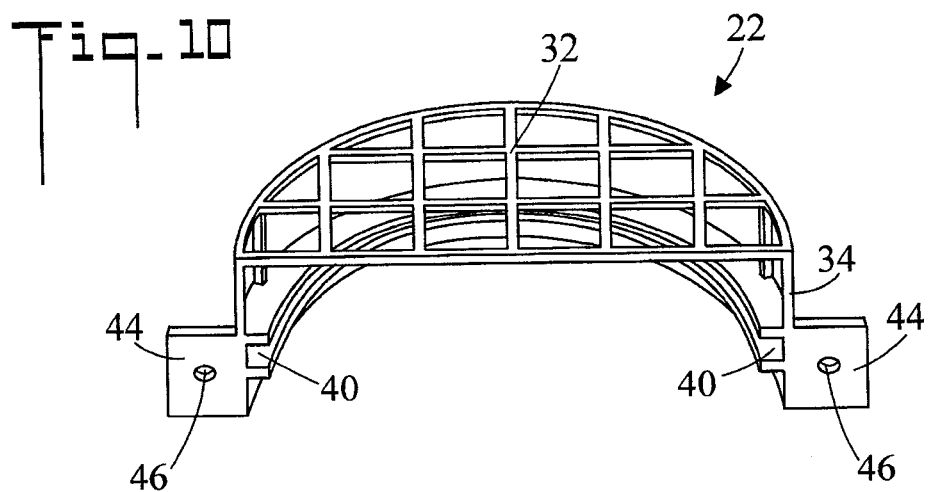
FIG. 10 is a front perspective view of the first section.

Referring initially to FIGS. 1 and 2, there are illustrated reduced prior art views of a top plan and side elevation of a prior art pond plant 500. Pond plant 500 is planted in a pot 600 that resides on the bottom 702 of a pond 700. Pond plant 500 has a plurality of stems 502 and each stem has a leaf 504 that floats on the surface of pond 700. Pond plant 500 also has roots 506 that are planted in the dirt in pot 600. Pot 600 has an open top and a top rim 602. As previously described, because the top of pot 600 is open, fish 800 such as koi can dig in the dirt and eat the roots 506 of pond plant 500 thereby killing the plant.

FIGS. 3 and 4 are top plan and side elevation views, respectively, of a cage, generally designated as 20, for protecting pond plant 500. FIG. 5 is a cross-sectional view along the line 5-5 of FIG. 3. Cage 20 is installed over the top of pot 600 to prevent fish 800 from gaining access to the roots of the plant. In the shown embodiment, cage 20 includes a first section 22 and a second section 24. First and second sections 22, 24 are removably connectable to each other and to the rim 602 of pot 600 (refer to FIG. 5). In the shown embodiment, first and second sections 22, 24 are identical and are installed in the shown opposing relationship around the rim 602 of pot 600.

Figure 12:
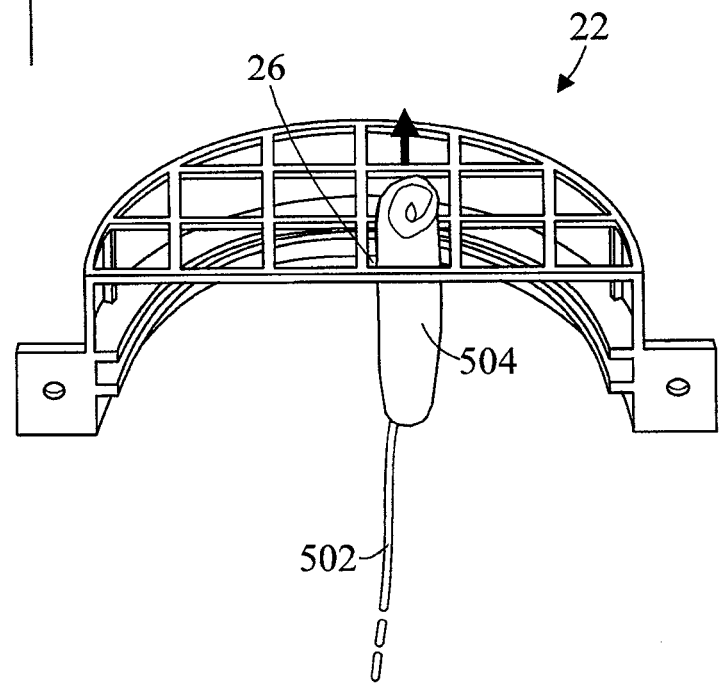
FIG. 12 is a front perspective view of a leaf and stem being passed through an opening in the first section.
Figure 13:
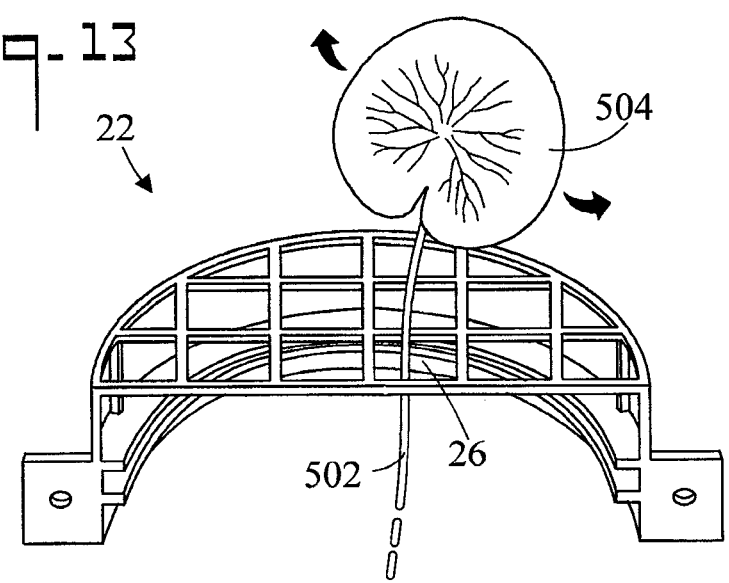
FIG. 13 is a front perspective view of the leaf and stem after they are passed through the opening in the first section.

First section 22 includes at least one opening 26 that is of sufficient size to pass the rolled up leaf 504 and stem 502 of pond plant 500 (refer to FIGS. 12 and 13 and the associated discussion). Similarly, second section 24 includes at least one opening 28 that is of sufficient size to pass the rolled up leaf 504 and stem 502 of pond plant 500. When first and second sections 22, 24 are connected to each other and to the rim 602 of pot 600, they form cage 20.

First section 22 includes a first grid 32 having a plurality of openings that is supported by a first plurality of legs 34. First grid 32 is substantially flat. Second section 24 includes a second grid 36 that is supported by a second plurality of legs 38. Second grid 36 is substantially flat. In the shown embodiment, first and second grids 32, 36 are semi-circular. Openings 26 and 28 are squares having 2 inch sides that are small enough to prevent the passage of fish 800 yet large enough to allow passage of leaves 504 and stems 502 of pond plant 500 (also refer to FIGS. 12 and 13 and the associated discussions). It may be appreciated that while square grids are illustrated, other types of opening configurations could also be utilized.

FIG. 5 is a cross-sectional view along line 5-5 of FIG. 3. Only first section 22 is shown. First section 22 includes a first rim-receiving groove 40 created by the space between cage seat 54 and flange 58. Second section 24 has an identical groove. First rim-receiving groove 40 is shaped and dimensioned to captively receive the rim 602 of pot 600 so that cage 20 can be fixedly connected around rim 602 of pot 600. First section 22 includes a pair of spaced apart first tabs 44 with each tab 44 having a hole 46 (see also FIGS. 10-11). First section 22 is connectable to second section 24 by bolting the pair of spaced apart first tabs 44 to the pair of spaced apart second tabs 50 with bolts 52 as is shown in FIGS. 3 and 4. It is noted in FIG. 5 that holes 46 and bolts 52 are vertically aligned with flange 58.

FIG. 6-9 are top plan, front elevation, side elevation, and rear elevation views, respectively, of first and second sections 22, 24. First section 22 is identical to second section 24, and as such the figures and descriptions pertaining to first section 22 also apply to second section 24. Shown are first and second openings 26, 28; first and second grids 32, 36; first and second legs 34,38; first and second rim-receiving grooves 40, 42; first and second tabs 44, 48; first and second holes 46, 50; first and second cage seats 54, 56; and first and second flanges 58, 60.

Figure 11:
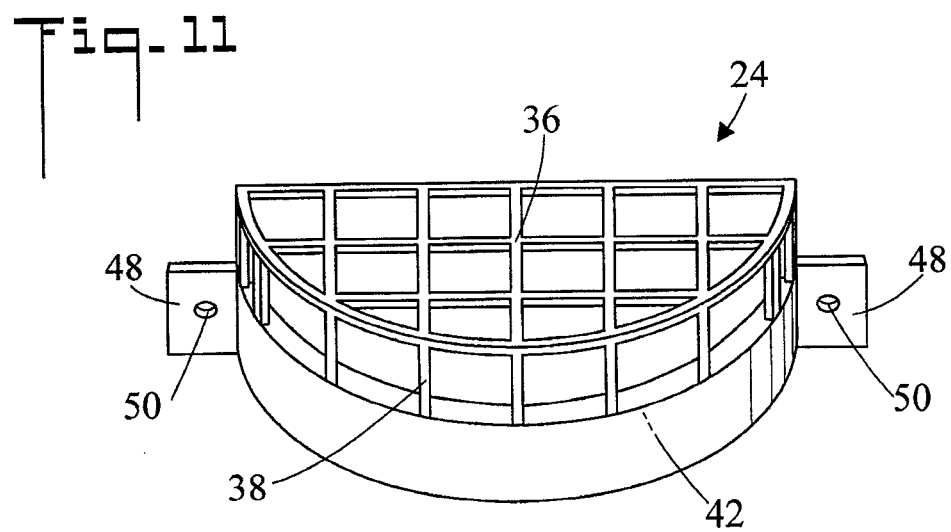
FIG. 11 is a rear perspective view of the second section.

FIG. 10 is a front perspective view of first section 22, and FIG. 11 is a rear perspective view of second section 24. The two sections are shown in a relative position to be placed around rim 602 of pot 600 as shown in FIGS. 3 and 4. Shown are first and second grids 32, 36, first and second legs 34, 38, first and second rim-receiving grooves 40, 42, first and second tabs 44, 48 and first and second holes 46, 50.

In an embodiment, cage 20 is fabricated from a polymer. In another embodiment cage 20 is shaped and dimensioned to connect to the rim 602 of a five gallon pot 600, and has a connected diameter of about twelve inches. It may be appreciated that cage 20 can be combined with plant 500 and pot 600 to form a system for protecting a pond plant.

FIG. 12 is a front perspective view of first section 22 showing rolled up leaf 504 and stem 502 being passed through opening 26. FIG. 13 is a front perspective view after leaf 504 and stem 502 have been passed through opening 26. Leaf 504 is rolled up to pass it through the opening because it is too large to otherwise pass through the opening. When pond plants are purchased by a consumer, they are typically full grown with large leaves. When the leaf 504 is released, it opens into its natural shape as indicated by the arrows. A leaf 504 and stem 502 can be similarly passed through opening 28 in second section 24. In an embodiment, openings 26 and 28 are of sufficient size to pass a six inch diameter (d) leaf 504 that has been rolled up (also refer to FIG. 1). A square grid opening of about 2 inches on a side is a useful size for passing such a leaf 504.

Figure 14:
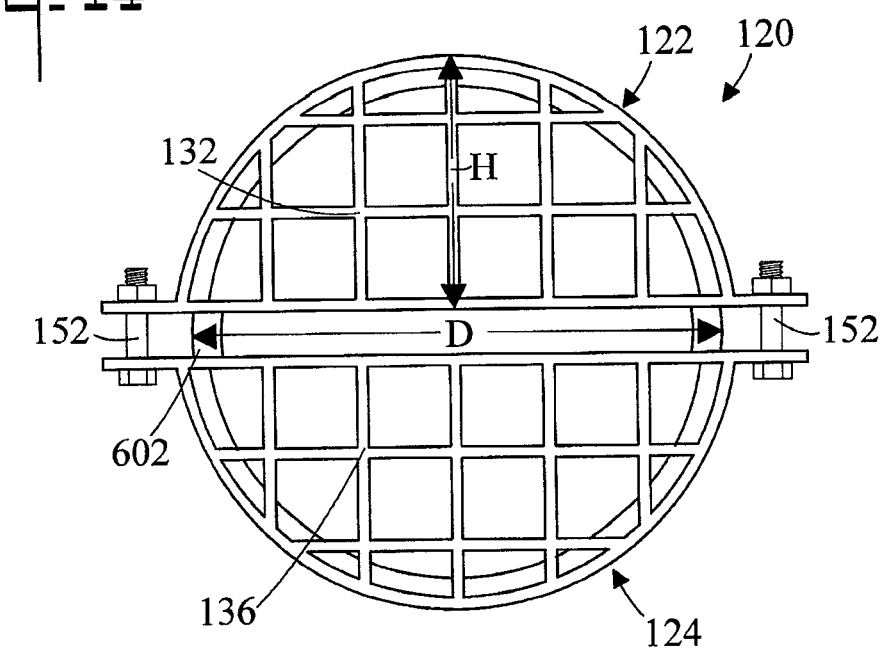
FIG. 14 is a top plan view of a second embodiment of the cage.

FIG. 14 is a top plan view of a second embodiment of the device, generally designated as 120. Cage 120 includes first and second grids 132, 136 that have truncated semicircular shapes. When first and second sections 122, 124 are bolted together on the rim 602 of pot 600, first and second sections 122, 124 reside in spaced apart relationship. Because of the spacing, bolts 152 can exert continuous pressure on first and second sections 122, 124 to hold them securely together on pot 600 around rim 602. As defined herein, a truncated semi-circular shape has a height H that is less than half of the diameter D of rim 602 of pot 600.

Figure 15:
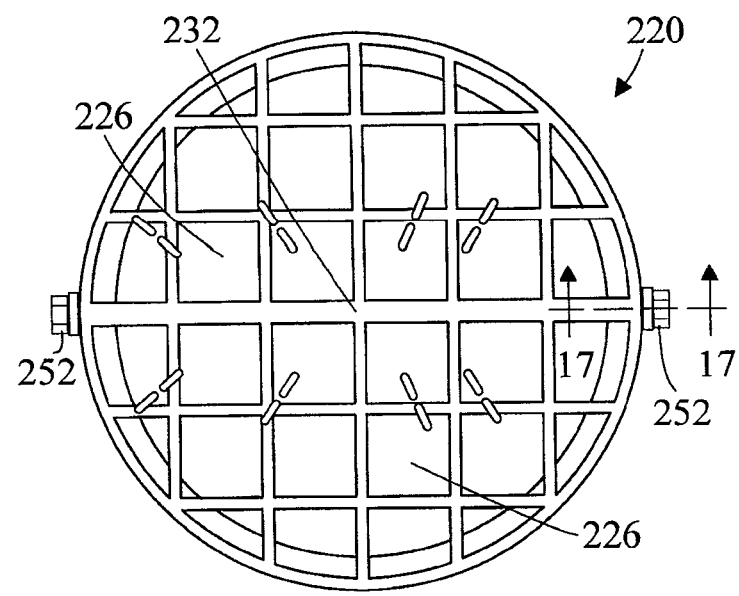
FIG. 15 is a top plan view of a third embodiment of the cage.
Figure 16:
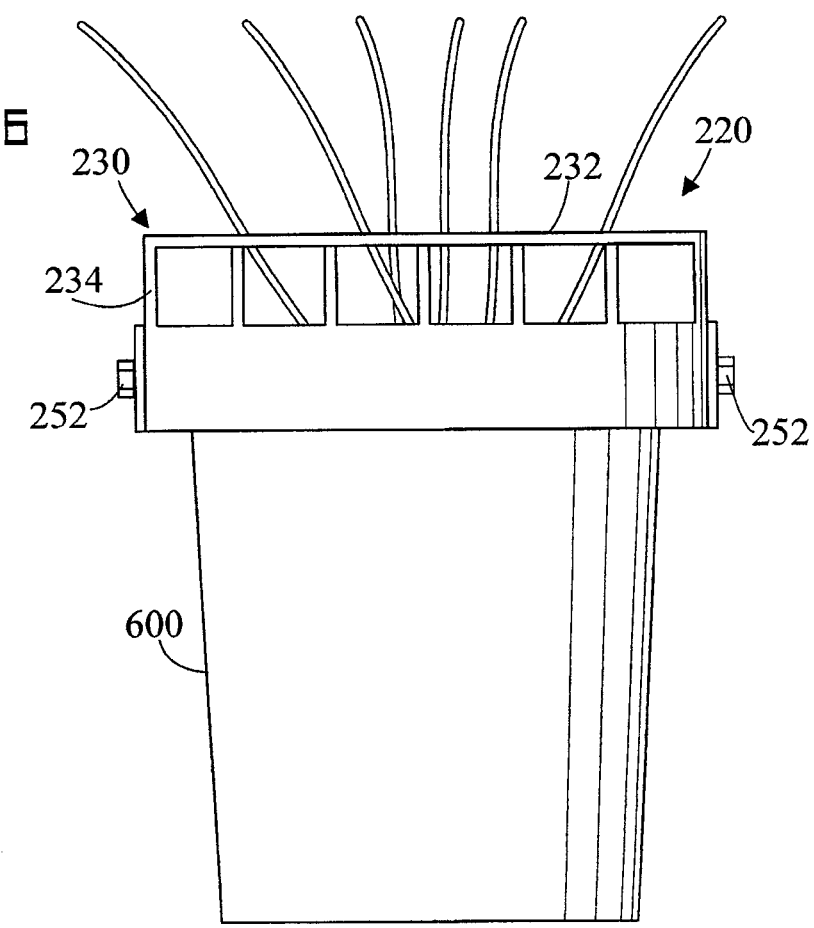
FIG. 16 is a front elevation view of the third embodiment.
Figure 17:
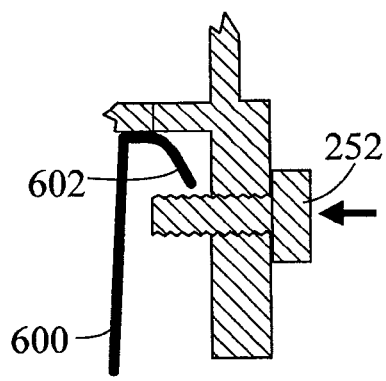
FIG. 17 is an enlarged cross-sectional view along line 17-17 of FIG. 15; and, FIG. 18 is a side elevation view of the cage being used by a male and female fish.

FIGS. 15 and 16 are top plan and side elevation views, respectively, of a third embodiment of the cage, generally designated as 220. Cage 220 is similar to cage 20 except that it is made as one piece. Cage 230 has a plurality of openings 226 that are of sufficient size to pass the leaf 504 and stem 502 of the pond plant 500. Cage 230 includes a grid 232 that is supported by a plurality of legs 234. FIG. 17 is an enlarged cross sectional view along line 17-17 of FIG. 15. A pair of bolts 252 screw into cage 220 underneath rim 602 to lock cage 220 to rim 602. It may be appreciated that other methods of connecting cage 220 to rim 602 of pot 600 could also be utilized.

Figure 18:
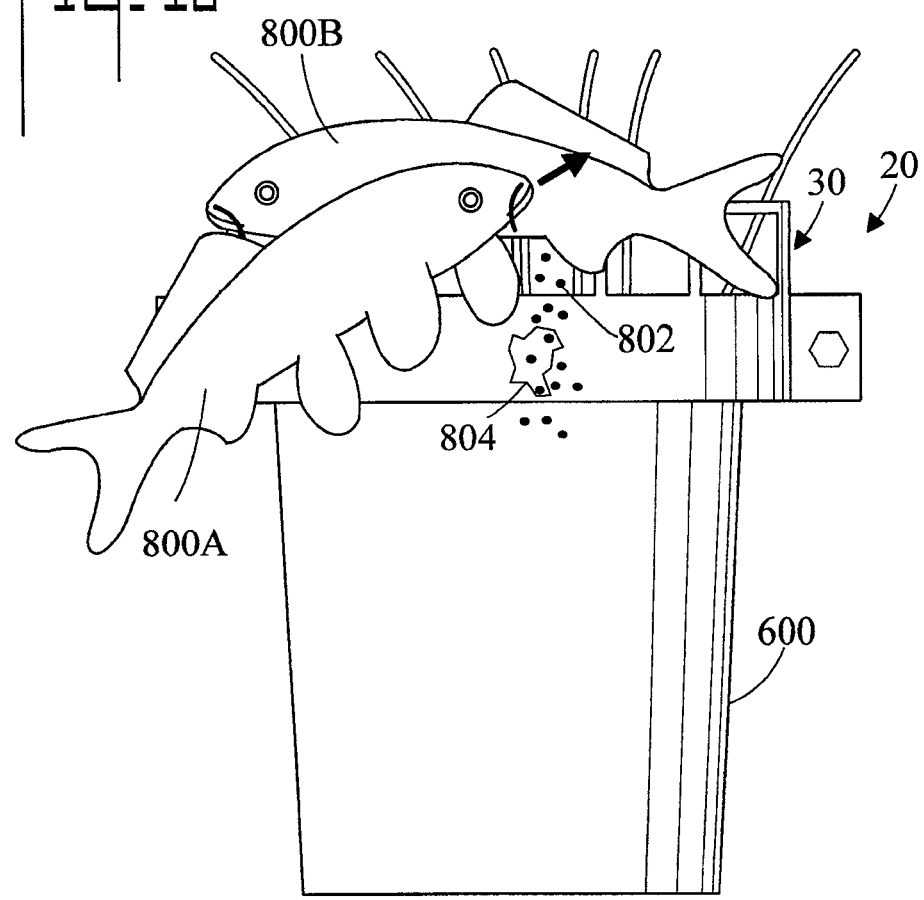

FIG. 18 is a side elevation view of cage 20 being used by a male 800A and female 800B fish. The male fish 800A bangs the female fish 800B against the side of the pot 600 and cage 20 causing female fish 800B to discharge roe 802. Some of the roe 802 floats into cage 20 and into pot 600 as indicated by the broken away area 804. Some of the milt from the male floats with the roe into the pot where it fertilizes the roe. The fertilized roe is thereby protected by the cage 20 from being eaten by the fish.

In terms of use, a method for protecting a pond plant 500 includes (refer to FIGS. 1-18):

(a) providing a pond 700 having a bottom 702;

(b) providing a pond plant 500 that is planted in a pot 600, the pot 600 having a rim 602, the pond plant 500 having a plurality of stems 502, each stem 502 having a leaf 504, (c) providing a cage 20 for protecting pond plant 500 including:

a first section 22;

a second section 24;

first 22 and second 24 sections removably connectable to each other and to rim 602 of pot 600;

first section 22 including at least one opening 26 that is of sufficient size to pass leaf 504 and stem 502 of pond plant 500; and, second section 24 including at least one opening 28 that is of sufficient size to pass leaf 504 and stem 502 of pond plant 500;

(d) upwardly passing a leaf 504 and stem 502 through opening 26 in first section 22;

(e) upwardly passing another leaf 504 and stem 502 through opening 28 in second section 24;

(f) after (e), connecting first 22 and second 24 sections to each other so that the connected sections connect to rim 602 of pot 600; and, (g) placing pot 600 on bottom 702 of pond 700.

The method further including:

in (c), first section 22 including a pair of spaced apart first tabs 44, each tab 44 having a hole 46;

in (c), second section 24 including a pair of spaced apart second tabs 48, each tab 48 having a hole 50;

in (c), first and second sections 22, 24 connectable by bolting the pair of spaced apart first tabs 44 to the pair of spaced apart second tabs 50;

providing two bolts 52; and, in (f), using bolts 52 to connect first and second sections 22, 24 together around rim 602 of pot 600.

The method further including:

in (c), first section 22 including a first rim-receiving groove 40;

in (c), second section 24 including a second rim-receiving groove 42; and, in (f), causing first and second rim-receiving grooves 40, 42 to captively receive rim 602 of pot 600.

The method further including:

prior to (d), rolling up leaf 504; and, prior to (e), rolling up the other leaf 504.

The method further including, cage 20 cooperating with a male fish 800A and a female fish 800B:

in (f), when first and second sections 22, 24 are connected to each other and to rim 602 of pot 600, first and second sections 22, 24 forming a cage 30; and, the male fish 800A urging the female fish 800B into contact with the pot 500 and cage 20 causing the female fish 800B to discharges roe 802.

The method further including:

some of the roe 802 falling through cage 20 and into pot 600.

The embodiments of the cage and method of use described herein are exemplary and numerous modifications, combinations, variations, and rearrangements can be readily envisioned to achieve an equivalent result, all of that are intended to be embraced within the scope of the appended claims. Further, nothing in the above provided discussions of the cage and method should be construed as limiting the invention to a particular embodiment or combination of embodiments. The scope of the invention is defined by the appended claims.

I claim:

1. A cage for protecting a pond plant that is planted in a pot that resides on the bottom of a pond, the pot having a rim, the pond plant having a plurality of stems, each stem having a leaf, the cage comprising:

a first section; a second section; said first and second sections removably connectable to each other and to the rim of the pot;

said first section including at least one opening that is of a sufficient size to pass the leaf and stem of the pond plant;

said second section including at least one opening that is of a sufficient size to pass the leaf and stem of the pond plant; and said cage including a first semi-circular grid that is supported by a first plurality of substantially vertical legs, and a second semi-circular grid that is supported by a second plurality of substantially vertical legs.

2. The cage according to claim 1, further including:

said first and second grids each having a truncated semi-circular shape; and, so that when said first and second sections are connected to each other and to the rim of the pot said first and second sections reside in spaced apart relationship.

3. The cage according to claim 1, further including:

said first section including a pair of spaced apart first tabs, each said tab having a hole;

said second section including a pair of spaced apart second tabs, each said tab having a hole; and, said first and second sections connectable by bolting said pair of spaced apart first tabs to said pair of spaced apart second tabs.

4. The cage according to claim 1, further including:

said first section including a first rim-receiving groove;

said second section including a second rim-receiving groove; and, said first and second rim-receiving grooves shaped and dimensioned to receive the rim of the pot.

5. The cage according to claim 1, further including:

said openings of said first and second sections being of sufficient size to pass a leaf that has been rolled up.

6. A method for protecting a pond plant, comprising:

(a) providing a pond having a bottom;

(b) providing a pond plant that is planted in a pot, said pot having a rim, said pond plant having a plurality of stems, each stem having a leaf;

(c) providing a cage for protecting said pond plant including:

a first section;

a second section;

said first and second sections removably connectable to each other and to said rim of said pot;

said first section including at least one opening that is of sufficient size to pass said leaf and stem of said pond plant;

said second section including at least one opening that is of sufficient size to pass said leaf and stem of said pond plant; and, said cage including a first semi-circular grid that is supported by a first plurality of substantially vertical legs, and a second semi-circular grid that is supported by a second plurality of substantially vertical legs;

(d) upwardly passing a said leaf and stem through said opening in said first section;

(e) upwardly passing another said leaf and stem through said opening in said second section;

(f) after (e), connecting said first and second sections to each other so that said connected sections connect to said rim of said pot; and, (g) placing said pot on said bottom of said pond.

7. The method of claim 6, further including:

in (c), said first section including a pair of spaced apart first tabs, each said tab having a hole;

in (c), said second section including a pair of spaced apart second tabs, each said tab having a hole;

in (c), said first and second sections connectable by bolting said pair of spaced apart first tabs to said pair of spaced apart second tabs;

providing two bolt connectors; and, in (f), using said bolt connectors to connect said first and second sections together around said rim of said pot.

8. The method of claim 6, further including:

in (c), said first section including a first rim-receiving groove;

in (c), said second section including a second rim-receiving groove; and, in (f), causing said first and second rim-receiving grooves to captively receive said rim of said pot.

9. The method of claim 6, further including:

prior to (d), rolling up said leaf; and, prior to (e), rolling up said other leaf.

10. The method of claim 6, the cage cooperating with a male fish and a female fish, the method further including:

in (f), when said first and second sections are connected to each other and to said rim of said pot, said first and second sections forming a cage; and, the male fish banging the female fish into contact with said pot and cage causing the female fish to discharges roe.

11. The method of claim 10, further including:

some of said roe falling through said cage and into said pot.

\* \* \* \* \*